April 9, 1957  E. E. HAGELINE  2,787,913
PULLEY AND METHOD OF FORMING
Filed Feb. 8, 1955
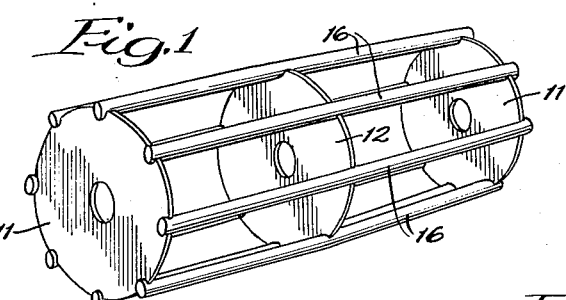
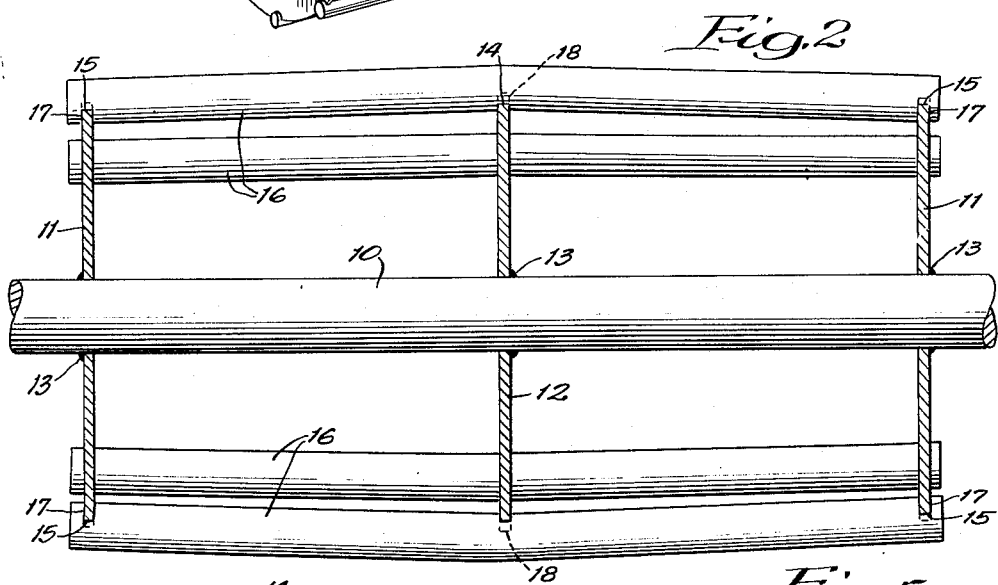
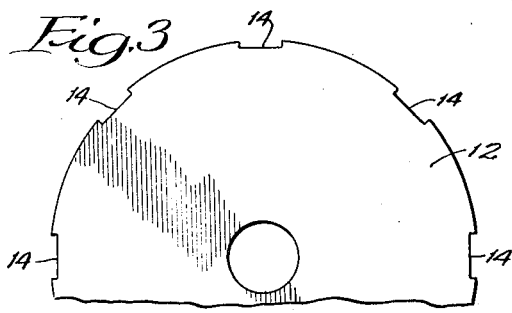
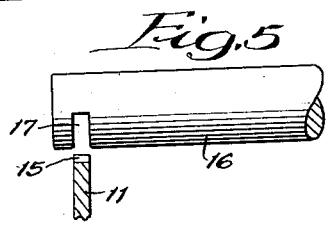
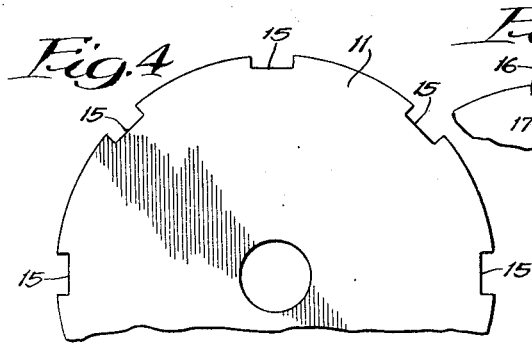
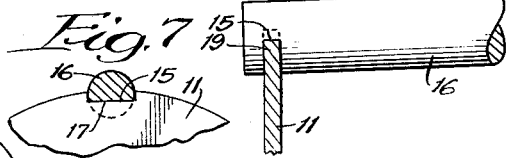
INVENTOR:
Emil E. Hageline,
BY
Dawson Tilton & Graham
ATTORNEYS.

United States Patent Office 2,787,913
Patented Apr. 9, 1957

2,787,913

PULLEY AND METHOD OF FORMING

Emil E. Hageline, Chicago, Ill., assignor to The Lathrop-Paulson Company, Chicago, Ill., a corporation of Illinois Application February 8, 1955, Serial No. 486,799

10 Claims. (Cl. 74—230.6)

This invention relates to a pulley and method of forming. The pulley is particularly useful in connection with a conveyor belt, whether used as a drive pulley or as an end pulley.

In the construction of pulleys employed for carrying belts and the like, it is common to fabricate the pulley from a plurality of rods supported upon disks carried by the shaft. Such a structure is particularly useful in connection with conveyors used in cold rooms or hardening rooms where flexible gear devices are employed with the pulley for tightening the belt about the pulley to prevent slippage.

In the fabrication of a pulley of the character described, it is the usual practice to equip the shafts with disks and to weld the rods to the disks along the periphery of the disks and in spaced relation. With this structure, it is found that the heat of the welding operations tends to produce a distortion of the product and it is necessary later to press the united structure into the desired contour or shape. Further, the welding operations are expensive and require considerable time.

An object of the present invention is to provide a method whereby a pulley of the character described can be formed without welding and with a minimum of operations while at the same time producing a finished pulley of the desired shape. Another object is to provide a pulley structure integrated without welding or in which a minimum of welding is employed, while at the same time producing a pulley having the desired contour and without requiring special shape-forming operations. Other specific objects and advantages will appear as the specification proceeds.

The invention is shown, in an illustrative embodiment, by the accompanying drawing, in which—

Figure 1 is a perspective view of a pulley embodying my invention; Fig. 2, an enlarged vertical sectional view; Fig. 3, a broken end view of the central disk; Fig. 4, a broken end view of one of the end disks; Fig. 5, a broken sectional view of an end disk portion about to enter a slot in one of the rods; Fig. 6, a view similar to Fig. 5 but showing the disk portion deflected or bent within the slot of the rod to secure the same therein; and Fig. 7, a sectional view of the rod at the point where the slot therein receives the disk, as indicated by the arrow in Fig. 6.

In one embodiment of my invention, the rods which are to be employed in fabricating the pulley are provided with slots in their ends. The rods are then bowed outwardly in their central portions so that the slots now face slightly inwardly. The series of bowed rods are then aligned so that the slots at their ends face the disks and the rods are then all pressed inwardly against the disks so that the operation results in deflecting or bending the disk portions aligned with the slots slightly outwardly. This slight outward turning of the disk portions at each end of the rods serves to lock the rods rigidly upon the disks.

In the specific illustration given, 10 designates a shaft, which may be an idler shaft or a drive shaft, and to the shaft may be welded the end disks 11 and preferably a center disk 12. If a crown pulley is to be formed, the center disk 12 is slightly larger than the diameter of the end disks 11. It will be understood, however, that the present invention may be employed in forming pulleys of uniform diameter as well as crown pulleys, etc.

The welding of the disks to the shaft 10 is indicated by the numeral 13. The central disk 12 is shown provided with spaced notches or depressions 14, and the end disks 11 are shown provided with spaced notches or depressions 15.

The rods 16 are preferably cut in the desired lengths from straight rod stock, and while the rods are straight, slots 17 are formed in the ends of each rod and a slot 18 is formed in the center of each rod. The rod is then bowed centrally, as indicated best in Fig. 2. It will be observed that when the rod 16 is bowed centrally, the central notch 18 remains substantially unchanged in direction, while, on the contrary, the notches 17 at the ends of each rod are directed slightly inwardly and therefore at an angle with respect to the disk 11 facing the same. The angular arrangement of the slot 17 and the disk 11 is best illustrated in Figs. 5 and 6. When the assembled rods are placed within a press and the entire group of rods forced inwardly to the position shown in Fig. 6, the outer arcuate portion 19 of the disk 11 is bent outwardly so as to conform to the changed angle of the slot 17. The result is that the outwardly bent portions 19 of the end disks 11 thus grip and lock the rods 16 to the end disks and unite the entire structure rigidly in a completed pulley unit. The central disk 12 is not effective in the interlocking process, but it does serve to support the rods and steady them as they deflect the end portions of the side disks 11.

After the pressing operation described, the pulley is complete and has the desired final shape. There is no need for a further pressing operation for the purpose of shaping. The press interlock formed is sturdy and provides a strong, integrated pulley structure. If desired, the end points of the disks adjacent the rods may be welded for further strength, but for all practical purposes, it is found that such welding is not necessary.

The notches in the several disks are effective in locating the rods and maintaining them in true spaced relation during the pressing operation, while at the same time the notches are further effective as guides during the pressing operation for the forming of the interlock between the end disks and the rods.

It will be understood that great variations may be made in the actual structure of the pulley. For example, if it is desired to use the pulley as an idler, bearings may be inserted within the disks (at the point where the welding 13 is now shown), so that the disks move freely on the bearings and thereby upon the shaft 10. If the pulley is used as a drive shaft, the structure may be as shown and preferably a key is employed between the shaft and the disks. Since all such changes are well understood, a further detailed description is believed unnecessary. In the new method, as described above, it is found that as the rods and disks are assembled and are brought together in the alignment illustrated, the entire uniting of the parts is brought about by one operation of the hydraulic press, the disk portions at the ends of the rods being deflected outwardly, as illustrated best in Figs. 5 and 6. While the procedure may be varied, it is found that the single pressing operation described will ordinarily be sufficient to integrate the parts in their assembled relation, as shown in Figs. 1 and 2. The disks may be united to the rods in an initial operation, as shown in Fig. 1, and the shaft 10 later secured to the disks by welding, or they may be mounted upon the shaft by bearings, as above described.

While in the foregoing specification I have set forth a specific structure and a specific procedure in considerable detail, it will be understood that such details of structure and procedure may be varied widely by those skilled in the art without departing from the spirit of my invention.

I claim:

1. In a process for forming a pulley consisting of rods mounted upon disks, the steps of forming slots in the rods, aligning disks therewith, said slots extending at an angle slightly away from the line of alignment projected beyond the disks, and pressing said rods upon said disks to deflect portions of the disks within said slots.

2. In a process for forming a pulley, the steps of slotting substantially straight bars adjacent their ends substantially at right angles thereto, bowing the bars outwardly along their centers in the direction of said slots, and pressing disks into the slots of a plurality of bowed rods to bend the edges of the disk within said slots to form an interlock therewith.

3. In a process for joining disks to bars to form an interlock therewith, the steps of forming in bars slots having a width adapted to snugly receive said disks, said slots extending at an angle slightly away from the perpendicular, and then pressing a plurality of said bars against said disks with the slots aligned with the slot entrances aligned with said disks, whereby the edge portions of said disks are bent within said slots.

4. In a process for joining disks to bars to form an interlock therebetween, the steps of slotting the end portions of the bars, each slot having a width adapted to receive snugly said disks, said slots extending at an angle from the perpendicular and being inclined slightly toward each other, and pressing a plurality of said bars upon said disks, whereby portions of said disks are bent within said slots to form an interlock with said bars.

5. The process of claim 4, in which said disks are notched to receive said bars and to hold them in alignment during said pressing operation.

6. In a process for forming a pulley, the steps of slotting substantially straight bars at least adjacent their ends with the slots running at right angles to the edges of the bars, bowing the bars outwardly to cause the end slots of the bars to face slightly inwardly, placing between the bars a plurality of disks including a central disk and end disks, the central disk being of greater diameter than the end disks, and pressing at least the end disks into the end slots of said bars to bend the edges of said end disks and to form an interlock between them and said rods.

7. A pulley, comprising a plurality of disks, a plurality of bars having slots receiving the edge portions of said disks, said slots extending at an angle away from the perpendicular to the longitudinal bar surface and said disks having portions thereof bent within said slots.

8. The structure of said claim 7, in which said disks have their bent portions extending in diverging directions to form an interlock.

9. The structure of claim 7, in which there is a central disk of larger diameter than the end disks, the disks being notched to receive said bars.

10. A pulley, comprising a plurality of disks having spaced notches therein, a plurality of bars having their ends provided with slots extending away from the perpendicular to the longitudinal bar surface and inclined slightly inwardly, said disks having peripheral edge portions thereof received within said slots and bent laterally to form an interlock with said bars.

References Cited in the file of this patent

UNITED STATES PATENTS

| | | |
|---|---|---|
| 1,196,921 | Black | Sept. 5, 1916 |
| 1,499,920 | Godden | July 1, 1924 |
| 2,236,027 | Bowen et al. | Mar. 21, 1941 |
| 2,356,026 | Berry | Aug. 15, 1944 |
| 2,591,860 | Owens | Apr. 8, 1952 |